Figure 14:
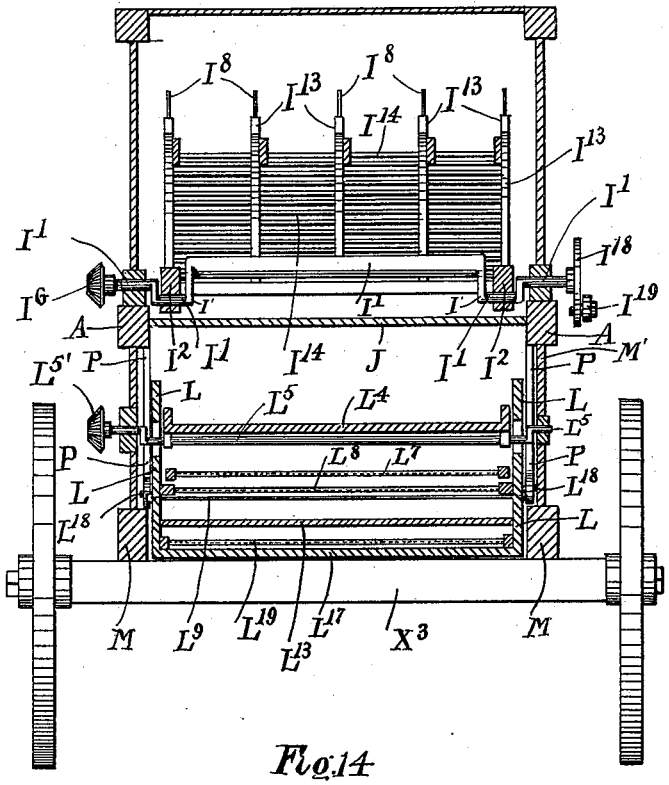

(No Model.) 5 Sheets—Sheet 1.
F. & M. EVES.
GRAIN AND SEED SEPARATOR.
No. 598,984. Patented Feb. 15, 1898.
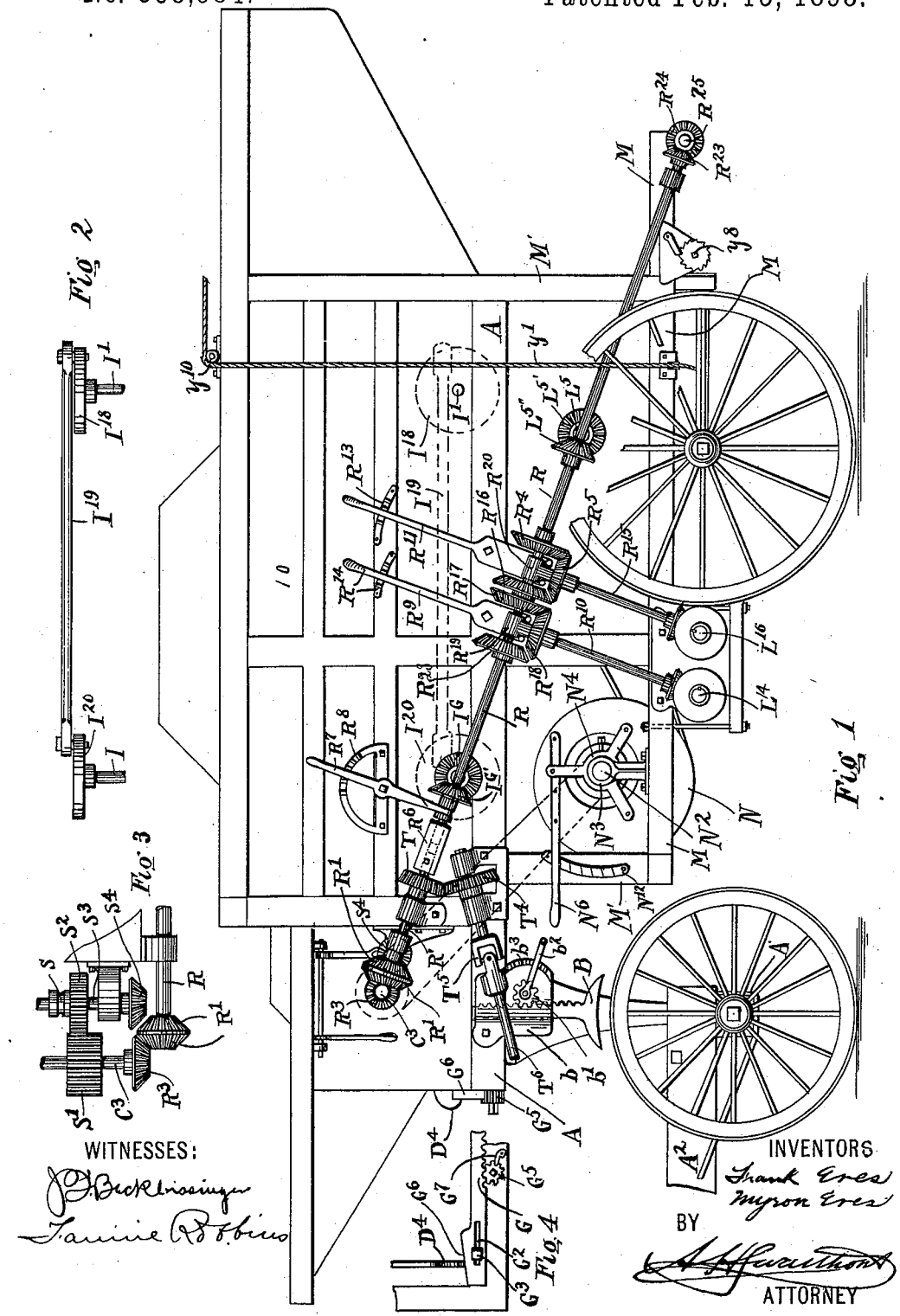
WITNESSES:
INVENTORS
Frank Eves
Myron Eves
BY
ATTORNEY

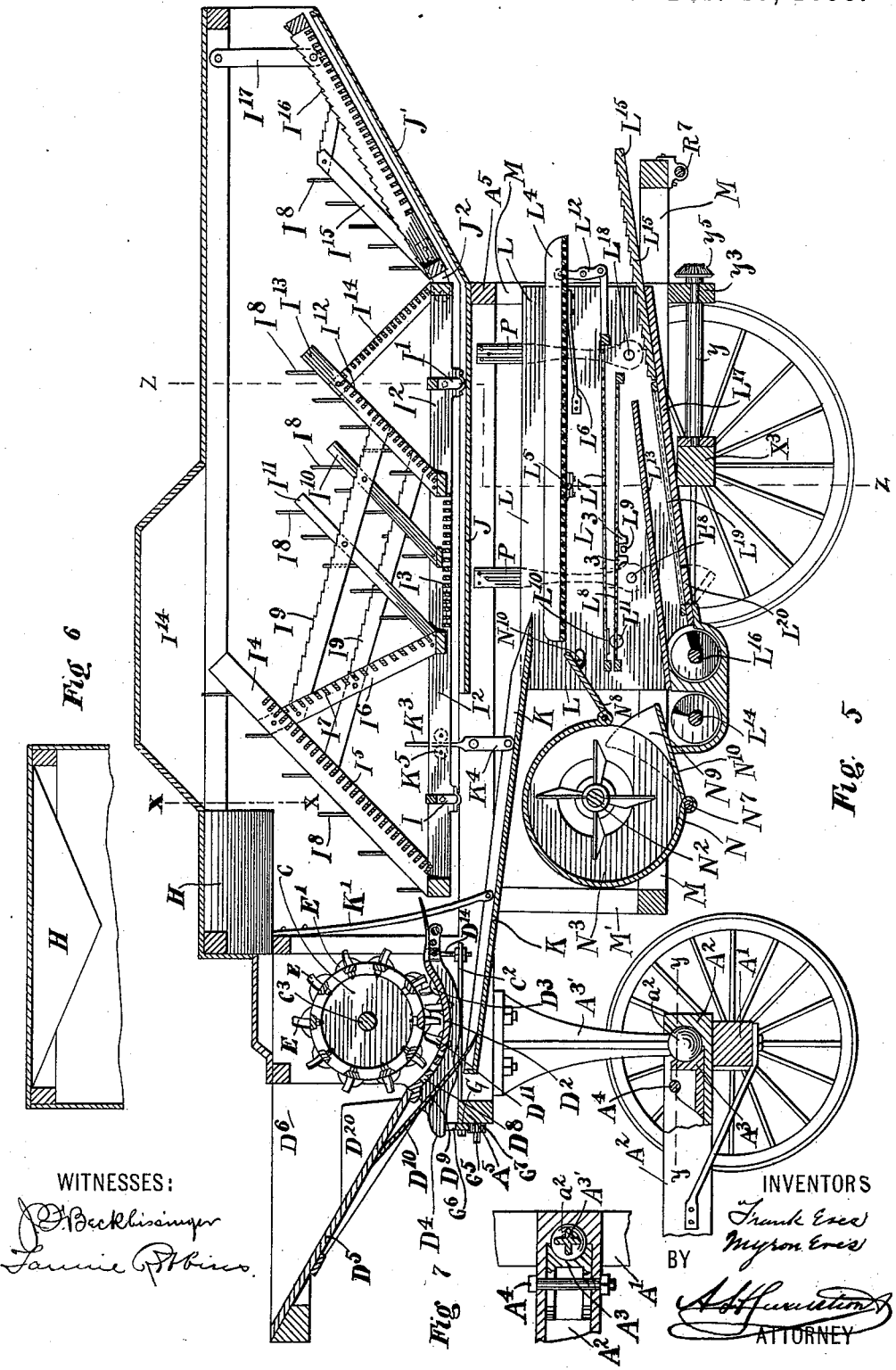

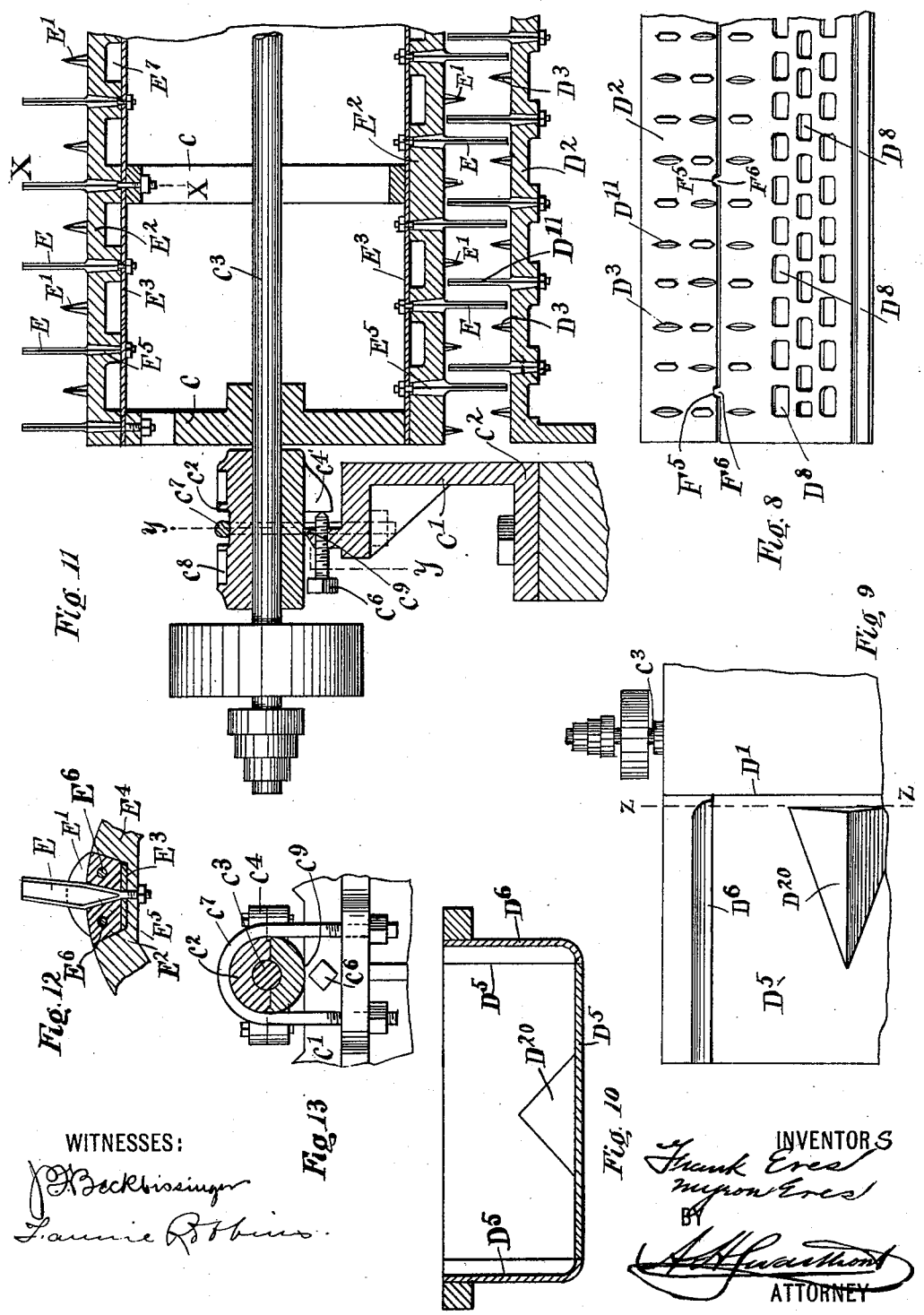

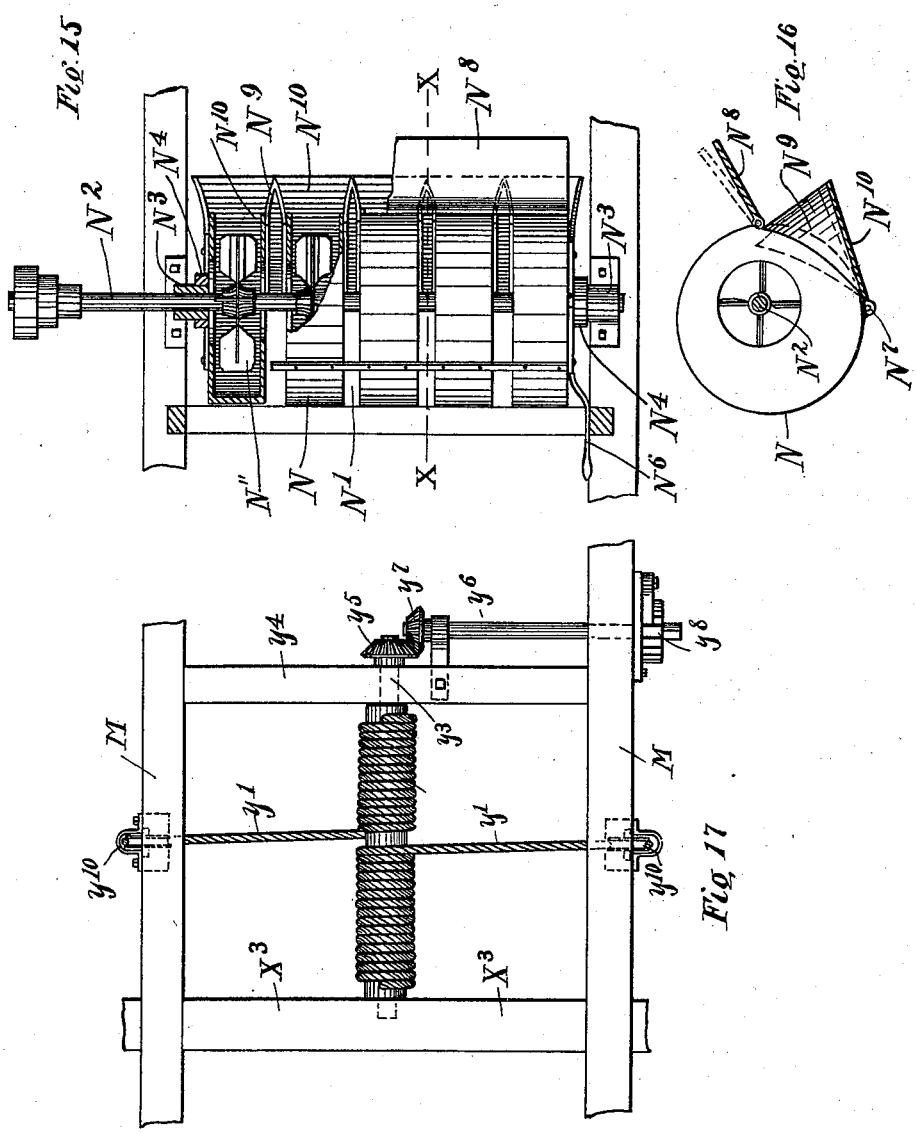

UNITED STATES PATENT OFFICE.

FRANK EVES AND MYRON EVES, OF MURPHYSBOROUGH, ILLINOIS; SAID MYRON EVES ASSIGNOR TO SAID FRANK EVES.

GRAIN AND SEED SEPARATOR.

SPECIFICATION forming part of Letters Patent No. 598,984, dated February 15, 1898.

Application filed June 24, 1893. Serial No. 478,745. (No model.)

*To all whom it may concern:*

Be it known that we, FRANK EVES and MYRON EVES, citizens of the United States, and residents of Murphysborough, in the county of Jackson and State of Illinois, have invented certain new and useful Improvements in Grain and Seed Separators, of which the following is a specification.

Our invention relates to machines for threshing and separating grain from the straw and chaff; and it consists in the novel features of construction, arrangement, and combination hereinafter described.

Our invention relates not only to the means for separating the grain from the straw after it has passed through the cylinder and to the means for separating the grain from the chaff, dust, and imperfect grain, but also to the threshing-cylinder and concave, the feed-board, carrier-adjuster, and to the means described for steadying the machine when in use.

Figure 1 is a side elevation of the machine. Fig. 2 is a detail showing the pitman connecting the rack-shafts I and I'. Fig. 3 is a detail of the gearing operating the cylinder. Fig. 4 is a detail of the concave adjustment. Fig. 5 is a longitudinal section of the machine. Fig. 6 is a detail of the top of the housing in the rear and above the cylinder, looking from the rear of the machine. Fig. 7 is a section of the bearing on the front axle. Fig. 8 is a plan view of the concave. Fig. 9 is a top view of the feed-board. Fig. 10 is a section of the feed-board on line Z Z of Fig. 9. Fig. 11 is a vertical section through part of the cylinder and concave. Fig. 12 is a section of the cylinder-tooth and fastening device on line X X of Fig. 11. Fig. 13 is a detail of the adjustable bearing of the cylinder-shaft. Fig. 14 is a vertical section through the machine on line Z Z of Fig. 5. Fig. 15 is a top view of the fanning-mill drum with parts broken away, showing the fans. Fig. 16 is a section on line X X of Fig. 15 of the fanning-mill drum. Fig. 17 is a plan view of the carrier-adjuster.

In the drawings, M M are the side sills of the frame of the machine supported on the rear axle $X^3$, and from these sills by studding M' M' the beams A are supported in part, the beams extending to the front of the machine over the axle A', from which they are supported by the post $A^3$ and cross-sills $A^5$. To these sills, studding, beams, and cross-pieces the inner workings of the machine are secured and housed, $I^0$ representing the housing, which may be of any style or character.

I and I' are counterbalanced crank-shafts journaled in the frame of the machine and carry the rack or shaking device, by the operation of which the grain is shaken from the straw and the straw pushed to the rear end of the machine. The rack is hung in the cranks and the counterbalance to crank and rack. This rack is described as follows:

$I^2$ are sills of the rack and extend horizontally rearward from just behind the concave and rest upon the cranks I' of the counterbalanced crank-shafts I' and I. These sills $I^2$ are connected by rods $I^3$, forming a serrated bottom for the rack-shaking device. Extending from the front of the rack at regular distances and sloping to the rearward at an angle of about forty-five degrees are five or more bars $I^4$, having upon their front edge at regular distances forks $I^8$ and their rear edges connected by metal rods $I^5$, arranged close together, forming a grating, so as to prevent the passage of the straw. They are made, preferably, of metal, so as to resist the wear and friction of the grain upon them as it is thrown from the cylinder.

Supporting the top of the bars $I^4$ and extending from them to the base of the rack are braces $I^6$, provided with wooden slats $I^7$, connecting them across their rear edges, which forms a grating and holds up the straw and allows the grain to pass through.

$I^{10}$, $I^{11}$, and $I^{13}$ are bars similar to the bars $I^4$, connected to the base of the rack at regular distances and sloping rearward, each provided with forks $I^8$, as shown. These bars are arranged in series of three, four, five, or more, as desired, across the machine, five being shown in Fig. 14, and are not in transverse alinement, except the front bars $I^4$, and are for the purpose of supporting the straw on the shaking device and throwing it rearwardly as the rack is reciprocated by the operation of the cranks I I' and prevent the straw from settling upon the rack.

$I^9$ are braces connecting the rack-bars $I^4$, $I^{10}$, $I^{11}$, and $I^{13}$ near their upper ends and having their upper edges notched, the notch sloping to the front of the machine, so as to catch the straw and push it along, and are not only for the purpose of supporting the rack-bars, but also to prevent the straw getting by the bars and up on the base of the rack. The brace $I^9$ on the middle row of bars is higher than those on the side and divides the straw, shaking it toward the sides of the machine.

$I^{14}$ is a grating extending from near the top of the rear rack-bar $I^{13}$ to the rear of the rack and prevents the straw from accumulating or being crowded back upon the rack.

$I^{16}$ is an extension of the shaking device and is hinged to the rack at $J^2$ and supported in the rear by the hanger $I^{17}$, and is provided with the forked bar $I^{15}$ and a grated bottom.

It will be seen that by the revolution of the crank-shafts I and I', which are connected by the pitman $I^{19}$, secured to the disks $I^{18}$ and $I^{20}$, this shaking device will be given a rotary or reciprocating motion, it being shown in Fig. 5 at its lowest throw. This motion will carry the straw upward and then rearward, drop away from it and strike it again as it revolves, shoving it with each revolution a little to the rear until it is finally shoved out onto the carrier after having been thoroughly shaken.

J is a pan underneath the rear half of the rack, upon which the grain will fall as it passes through the shaker and along which it will be swept by the frontward movement of the rack as it reciprocates, J' being an extension of the pan under the extension $I^{16}$ and discharges the grain into the pan J.

K is a suspended pan underneath the shaking device and extends frontward to and underneath the front of the concave $D^2$, and upon this device the grain falls as it comes through the concave and shaking device. This pan is suspended by a spring K', secured to the frame in the rear of the cylinder, and by the reciprocating lever $K^4$, which is pivoted to the frame, one end of the lever $K^3$ passing upward between two rollers $K^5$ on the base of the shaking device, the movement of the shaking device operating the lever and thereby shaking the pan K, the spring K' resisting the motion. From this pan the grain is expelled onto the chaffer or sieve $L^4$ in the mill-box L, which is suspended within the frame of the machine by springs P P, secured to the frame and pivoted to the box L at $L^{18}$, respectively, its base sloping toward the front of the machine and to the auger $L^{16}$. This sieve $L^4$ is supported near the middle on the cranks of the shaft $L^5$ and in the rear on the pivoted bar $L^{12}$, which is pivoted at its center to the frame. Below the chaffer $L^4$ is a sieve $L^7$, its rear end supported and pivoted to the lower end of the pivoted bar $L^{12}$, its front end $L^{10}$ running over the roller $L^{11}$, secured in the front of the sieve $L^8$, which sieve rests upon the rod $L^9$, passing through the box. The lugs 3 3 underneath the sieve $L^8$ and on each side of the rod $L^9$ hold the sieve in position on the rod.

It will be observed that while the mill-box L is given the shaking motion by the crank $L^5$ and spring $L^6$ the chaffer $L^4$ will not only move with the box, but will also have a rotary motion at one end, and the sieve $L^7$ will move in the opposite direction and the sieve $L^8$ in the same direction as the chaffer $L^4$.

$L^{13}$ is a fixed board near the base of the mill-box, inclined toward the front of the mill and discharges the grain that falls upon it into the grain-auger $L^{14}$.

$L^{15}$ is an extension of the base $L^{17}$ of the mill-box and is adjustable, so that it may be pulled out or shoved in, as desired, according to the grain and the degree of wind employed in the mill. It has upon its upper face notches sloping to the rear, which are for the purpose of catching the kernels as blown from the mill and holding them and shaking them down into the elevator-auger $L^{16}$, which is located in front of the truck-wheel and at the side and parallel to the grain-auger, the space between the fixed board $L^{13}$ and the bottom $L^{17}$ being a flue leading to the elevator-auger, which it is common to locate in the rear of machine, but which we have located, as stated, in front of the rear truck.

$L^{19}$ is a screen resting on the base of the mill, by means of which the small grain may be separated and dropped through the trap-door $L^{20}$ in the base of the mill-box just in the rear of the elevator-auger.

N N are fanning-mill drums, and are arranged as shown in Fig. 15.

$N^2$ is a shaft running through the drum, journaled at $N^3$ on the frame and having upon its outer end step-pulleys connected by belting to the step-pulleys on the cylinder-shaft, by which the degree of speed may be governed, and having within the drums the fans $N^{11}$, arranged in sets, each set having a separate drum, the drums converging together at the rear of the drums, so as to be opened by a wind-board $N^{10}$, pivoted at $N^7$ to the edge of the drum at the opening.

The wind-board $N^{10}$ is divided into as many divisions as there are drums in the mill, each division having walls, as $N^9$, that extend upward on the outside of each drum and thus regulate the opening of the drums and make them uniform and give direction to the wind. These drums have a bearing $N^4$ upon the shaft $N^2$, but are loose on the bearing, and the drums may be turned on the shaft or bearing without interfering with the fans. The handle $N^6$, secured to the outer drum, is for this purpose. After the drum has been turned to the proper degree the handle is secured in one of the notches of the rack $N^{12}$ on the frame.

It will be observed that by turning the drums the wind-board $N^{10}$ will be opened or closed, and thus the direction of the wind may be varied, the lid $N^8$ being always held up out of the way, as shown in Fig. 5, the wind-board $N^{10}$ resting, as shown, on the edge of the frame supporting the grain-auger $L^{14}$, and as the handle $N^6$ is turned up the wind-board $N^{10}$ will be closed, and vice versa. These drums N N are open in front and also at the sides between the drums, so that a greater volume of air is drawn into them than by the old style of a closed drum with openings at the end. The air being taken in at the middle of the machine as well as at the sides greater volume will be obtained and therefore greater effectiveness.

C is a threshing-cylinder located in the forward part of the machine, its journals set in the self-adjusting bearings, described as follows:

$C'$ is a bracket bolted to uprights in the main frame.

$C^2$ are bearings for the journals of the cylinder and are made in two parts, the lower part having a lug $C^4$ and rests on the edge of the upwardly-extending arm $C^9$ of the bracket $C'$.

$C^7$ are clips for holding the boxes in place, and is a two-armed bolt passing down the sides of the boxes to a flange of the bracket $C'$, having nuts underneath the bracket-flange, holding them in position and tightening them upon the bearings.

$C^6$ are set-screws passing through the arm $C^9$ of the bracket and against the lug $C^4$ on the under bearing $C^2$, by which the boxes may be adjusted along the journal $C^3$ of the cylinder. The upper half of the boxes may be provided with oil-cups $C^8$, with suitable lids.

The cylinder-shaft $C^3$ extends through the walls of the machine-body and is provided with a large driving-pulley and a series of step-pulleys upon one side and upon the other with gearing, which will be hereinafter described.

The peculiar construction of the cylinder C is a part of our invention. It consists of two end plates and a middle ring, to which are secured the bars $E^2$, which form a slotted periphery of the cylinder, the bars being provided with regular transverse grooves, into which the teeth of the cylinder are set, as hereinafter described. The end plates are cast with slots in their periphery, having sloping walls, as shown in Fig. 12, the middle ring having corresponding slots, with an offset inside back of the slot, as shown in Fig. 11.

$E^3$ is a plate fitting in the bottom of the slot and provided with holes at regular distances for receiving the stem of the tooth.

$E^2$ is the cylinder-bar, fitting into the slot and extending across the cylinder above the plate $E^3$ and is provided with an orifice of the proper size and form to receive the tooth, hereinafter described.

$E^6$ are rods of wrought-iron cast into the cylinder-bar $E^2$ for the purpose of making it stronger and preventing the casting from falling apart should it be broken.

$E'$ are small teeth or fins on the outer edge of the cylinder-bar $E^2$ and are of the shape shown in Figs. 8 and 11, the base being large and long and extending upward to a point, the edges being beveled toward the center of the tooth.

E is the cylinder-tooth, and $D^{11}$ the tooth of the concave. They are both of the same form, the tooth being largest at the point where it enters the cylinder-bar, sloping from that point toward the stem on the inside of the cylinder. It is rectangular in form, its longest width being across the base. Its corners are cut off, forming six sides. The stem of the tooth is screw-threaded and adapted to receive a nut inside of the cylinder under the plate $E^3$. The upper part of the tooth outside of the cylinder slopes toward the upper end, the corners of the tooth being cut away, so that the front and rear faces of the tooth are nearly a sharp edge, instead of being square-cornered, as is the usual cylinder-tooth. We form the tooth and fins in this manner so that they may easily cut their way through the straw and prevent the blocking of the cylinder and a consequent failure to thresh out the grain. It also prevents the breaking or cracking of the grain, as the grain as it is thrown through the cylinder will strike against the sloping walls of the tooth and glance off. It may be observed also that if the tooth should become bent to one side it will be wedged back to alinement by striking the bevel side of the tooth.

$D^2$ is the concave underneath the cylinder and is provided with teeth $D^{11}$ and fins $D^3$ of like character to the teeth E and $E'$ of the cylinder. The front part of the concave is provided with small holes $D^8$, through which the grain may pass. This is made in two parts dovetailed together and held in alinement by the mortise-work $F^5$ and $F^6$. (Shown in Fig. 8.) This concave is adjustably secured underneath the cylinder to the side walls of the machine and is adjustable as follows:

$D^4$ is the framework supporting the concave. This frame $D^4$ rests upon a bar G in front of the framework of the machine, which is provided with a rack engaging a ratchet-wheel $G^5$, journaled in the frame and provided with a pawl $G^7$. The upper edge of the piece is wedge-shaped at the point where the frame $D^4$ rests upon it, and by turning the ratchet-wheel $G^5$ the piece G will be pushed one way or the other under the frame $D^4$. By this means the outer edge of the concave may be raised or lowered, the piece G being provided with a longitudinal slot $G^2$, through which a lug $G^3$ of the frame $D^4$ passes and moves and holds the frame $D^4$ in position on the piece G. The rear end of the concave is vertically adjustable by means of the bolt $D^{14}$ and the foot-plate $C^2$.

$D^5$ is the feed-board in front of the cylinder, and is provided with a hip $D^{20}$ in the middle of the board just in front of the cylinder for dividing the straw as it passes down the feed-board into the cylinder and prevents the straw passing into the cylinder in one body. The lower end of this feed-board $D^5$ rests upon the outer edge of the concave, as will be seen in Fig. 5, and is adjustable up and down with it, and has upon its edges the curved sides $D^6$, which accommodate the board to the walls of the feed-box, as it is adjusted with the concave. The walls of the frame in front of and at the side of the cylinder are concave, so as to prevent a square corner, as is common at the side of the front of the cylinder.

$D^{10}$ is a board supported by the frame supporting the concave and extends from above the lower end of the feed-board into the grain-pan K, and is for the purpose of catching the grain that may get through the perforations in the concave and passing it into the grain-pan K.

The front part of the machine-frame, the sills A, and the cross-sills $A^5$ are supported upon a bolster attached to a post $A^3$, whose lower end is provided with a ball $a^2$, resting in the framework on the front axle A'. This framework comprises a casting $A^2$ in the form of a box having a seat for the ball, and to this casting the tongue for hauling the machine is secured. The box is made in two parts for receiving the ball, one half of the seat being in the body of the casting, the other half being in the form of a cap $A^3$, fitting into the box and around the upper part of the ball, and is held in place in the box by the transverse bolt $A^4$. By this means the framework of the machine is supported and pivoted on the front axle, forming an equivalent to a fifth-wheel.

B B are jacks attached to the sills A over the front wheels and are used for the purpose of relieving the front axle of the support of the machine when working and also for steadying it in a level position. They are provided with curved feet to rest on the rim of the wheel and have rack-bars engaging a small pinion $b'$, operated by a crank $b^2$, which raises and lowers the jacks through the guides $b$.

R is a shaft in two parts, R and R', extending from engagement with the cylinder-shaft obliquely across the machine-frame to engagement with gearing $R^{24}$, secured to the rear end of the sill M, and to this shaft along the machine-frame is secured gearing for the purpose of operating the different cranks and shafts by which the internal machinery of the thresher is propelled.

R' is a double-beveled gearing engaging gearing $R^3$ on the end of the cylinder-shaft $C^3$, and also adapted to engage, when necessary, the beveled pinion $S^4$ on a stub-shaft $S^3$, having its bearing in the frame at the side of the shaft $C^3$ and is used only when horse-power is used to operate the machine. This shaft $S^3$ carries also a gear-wheel $S^2$, meshing into a gear-wheel S' on the shaft $C^3$, and this mechanism is used for the purpose of relieving and dividing the strain on the beveled gear R' and $R^3$ when horse-power is used, as mentioned, the horse-power being applied through the shaft $T^6$, the knuckles $T^5$, and the pinion $T^4$, meshing into the pinion T on the shaft R'. When steam or other power is used, the power is transferred by means of belting on the driving-pulley on the opposite end of the shaft $C^3$.

$R^6$ is a wrist engaging and connecting the shafts R and R', the shaft R being adapted to be pushed into the wrist to a certain degree by the lever $R^7$, pivoted to the frame and held in position in the rack $R^8$. This is for the purpose of disconnecting the gearing, throwing the machinery inside of the machine out of gear, as will hereinafter appear.

IG is a beveled gear on the crank-shaft I and meshes into the pinion IG' on the shaft R and thereby conveys motion to the crank-shaft I.

The grain-auger $L^{14}$ is propelled by means of the rod $R^{10}$, having a beveled gear $R^{18}$, meshing into a beveled gear $R^{17}$ or $R^{23}$ on the shaft R, $R^{10}$ being supported on the shaft R by the bearing $R^{19}$ and also by the spring-lever $R^{14}$, pivoted to the frame and engaging the bearing $R^{19}$, and by means of this lever the pinion $R^{18}$ may be made to engage either the pinion $R^{17}$ or $R^{23}$ by sliding the bearing $R^{19}$ on the shaft R one way or the other, thereby reversing the motion of the grain-auger $L^{14}$. We make this lever a flat spring in order that if the auger shall become clogged for any reason the strain upon the gearing will be such as to throw the pinion $R^{18}$ out of mesh with either one of the pinions $R^{17}$ and $R^{19}$, which will give a peculiar sound or alarm and notify the person in charge. The elevator-auger $L^{16}$ is operated in the same manner by the shaft $R^{15}$, having the gearing $R^5$, adapted to engage either of the beveled gears $R^4$ or $R^{16}$ on the shaft R as it may be operated by the spring-lever $R^{11}$, moving the bearing $R^{20}$ of the shaft $R^{15}$ on the shaft R, each spring-lever $R^{14}$ and $R^{11}$ being provided with a rack $R^{13}$ for holding the lever in position to which it may be moved.

$L^{5'}$ is a beveled gear on the crank-shaft $L^5$, engaged by the beveled gear $L^{5''}$ on the shaft R and operating the sieve shaft and mechanism. The lower end of the shaft R carries a beveled pinion $R^{23}$, meshing into corresponding pinion $R^{24}$ on the shaft $R^{25}$, journaled in the rear of the frame of the machine, which shaft $R^{25}$ carries the endless straw-carrier belt or chain. The shaft $N^2$, carrying the fans, is propelled by belting upon the opposite side of the machine.

In the rear of the frame of the machine is mechanism for raising and lowering the straw-carrier and consists of a shaft $y^6$, journaled across the rear of the frame, having upon one end a ratchet-wheel and pawl $y^8$, and upon the other a beveled pinion $y^7$ engaging the corresponding pinion $y^5$ upon the shaft $y^3$ at right angles to the shaft $y^6$, upon which shaft the rope or cable $y'$ is mounted. The shaft $y^6$ is operated by a crank at the side of the machine, as is common, to raise and lower the carrier, the cable or rope $y'$ running over the pulley $y^{10}$ on the top of the framework of the machine and extending from the pulleys to the carrier.

Fig. 16 illustrates that part of the top of the machine-frame just back of the cylinder.

H is a V-shaped framework depending from the top of the machine back of the cylinder, and is for the purpose of separating or dividing the straw as it is thrown from the cylinder. As is well known, the straw will come from the cylinder with considerable force, its direction being upward, and it will strike the V-shaped frame H and be deflected from each side downward into the rack-bars $I^4$, which will pick it up and throw it upward again into the hood $I^{14}$, from which it will drop onto the bars $I^9$ $I^{11}$, &c., to be by them again lifted and shaken. The middle bar $I^9$ being higher that the others again divides the straw, the entire action of the machine from the time the straw enters the feed until it passes onto the carrier being designed to thoroughly separate the straw, prevent its wadding and stuffing, and at the same time give it a thorough shaking.

Having thus described our invention, what we claim as new, and desire to secure by Letters Patent, is—

1. In a grain separating and cleaning device, the combination with the cylinder, a V-shaped frame above and back of the cylinder, the edge of the deflector extending longitudinally of the machine and deflecting the straw, two counterbalanced crank-shafts, the counterbalance being opposite the cranks and heavy enough to counterbalance the cranks and their load, the shafts being the proper distance apart and provided with a disk near their outer end, the disks connected by a pitman-rod, whereby the shafts may revolve synchronously, a rack carried in the cranks of the shafts and rotated by them, the cranks and rack located so as to sweep a stationary grain-board underneath the rack, the rack comprising a base resting in the cranks, two or more series of upwardly and rearwardly extending bars connected to the base, the first series in transverse alinement and connected by metal slats forming a serrated front of the rack in the rear of the cylinder, the following series not in transverse alinement, slats connecting the bars, braces connecting the front bars with the rear bars but not in alinement, braces connecting the top of the bars with the base, and slats across the braces forming serrations, and a recticulated bottom between the braces and each series of bars, of a secondary rack hinged to the rear of the rack supported in the crank-shafts, its rear end carried in a swing, whereby this secondary rack will have a reciprocating motion, a stationary pan under the racks and swept by them and delivering the grain onto a vibrating pan under the cylinder and rack, and the pan delivering the grain to the cleaning device, substantially as and for the purpose set forth.

2. In a grain-separator, the combination with the shaking device as described, of a stationary grain-pan under the rear of the shaking device, and swept by it as it rotates, and a reciprocating grain-pan under the cylinder and in front of the shaking device suspended by a spring and a lever pivoted to the frame, the end of the lever passing between antifriction-rollers on the base of the shaking device, whereby by the movement of the shaking device the pan is reciprocated, as described.

3. In a grain-separator, the combination with the body of the machine, of jacks consisting of rack-bars movably fixed in guides and provided with feet for standing on the rims of the forward wheels, pinions on the guide-plates meshing with said rack-bars, levers attached to said pinions, and segment-racks for locking said levers, substantially as specified.

4. In a grain-separator, the combination with the frame, the bracket C secured to the frame, the upwardly-extending lug $C^9$ integral with the bracket, the cylinder journal-boxes $C^2$ resting upon the edge of the lug $C^9$ and provided with a depending lug $C^4$ adjacent to the lug $C^9$, of the clip $C^7$ passing over the journal-boxes and through the arm of the bracket directly over the point of bearing of the boxes on the lug $C^9$, nuts on the ends of the clip under the arm of the bracket securing the journal-boxes to the lug $C^9$, and a set-screw passing through the lug $C^9$ and against the lug $C^4$ of the journal-boxes, substantially as and for the purpose set forth.

5. In a grain-separator, the combination with the counterbalanced crank-shafts I and I', of the shaking device mounted in the cranks of two counterbalance crank-shafts and having a longitudinal series of elevated racks, the middle series being highest and having also serrations $I^5$, $I^9$, $I^{12}$, and $I^{14}$, and upwardly-extending forks $I^8$, and a recticulated bottom, all carried on the crank-shafts, and a stationary grain-board J swept by the shaking device as it revolves, substantially as and for the purpose set forth.

6. In a grain separator and cleaning device, the combination with the grain-pans under the shaking device of a fanning-mill comprising a mill-box suspended in the machine-frame by springs secured to the frame and pivoted to the box so as to permit a longitudinal motion to the box, a shaft through the upper front part of the box transversely, a chaffer carried on cranks of this shaft with its rear end hinged to the upper end of a vertically-pivoted rod, a spring secured to the rear of the chaffer and the wall of the box, whereby when the chaffer is reciprocated the mill-box will vibrate, a sieve under the chaffer and extending farther front and supported in front on a roller journaled in a sieve underneath, and in the rear by the lower arm of the vertically-pivoted bar, whereby when in motion its vibratory motion is opposite to the motion of the chaffer, a sieve carrying a roller on its front end and supported on a lateral rod through the box, the two sieves being near together and cleaning each other, an inclined board under the sieves and leading to the grain-auger, an extensible base $L^{15}$ of the mill-box, and a blower in front of the mill-box, substantially as described.

7. In a grain-separator, a mill-box suspended in the lower part of the rear of the machine by springs pivoted to the mill-box and rigidly secured to the frame of the machine, a chaffer or sieve in the upper part of the mill-box supported on a crank-shaft $L^5$ passing through the mill, the chaffer supported in the rear of the mill by and pivoted to the upper arm of the vertically-pivoted bar $L^{12}$, and means for revolving the shaft whereby the chaffer will be given a rotary motion in front and a reciprocating motion in the rear, a spring-bar $L^6$ connecting the mill-box to the rear of the chaffer, whereby as the rear of the chaffer is reciprocated a vibratory motion will be given to the mill-box, substantially as and for the purpose set forth.

8. In a grain-separator, the combination of a vibrating pan K suspended at the forward part by spring-hangers K K', its rear end pivotally attached to the levers $K^4$ fulcrumed to the sides of the machine, and their upper ends playing between antifriction-rollers $K^5$ on the bars $I^2$, of the shaker by means of which a vibratory movement is imparted to said pan, substantially as described.

9. In a grain separating and cleaning device, the combination with a series of sets of fans on a central shaft, of a drum for each set, the drum provided with side openings for admitting air, and with rear openings in front of the sieves, the rear openings being in line, the walls of each drum converging to the walls of the drums on each side of the openings, forming a continuous opening, and a lid hinged to the upper edge of the rear opening and adapted to give direction to the wind through the series, and a wind-board pivoted to the lower edge of the rear opening and having divisions adapted to fit into each drum and thereby enlarge or decrease the size of the opening, substantially as specified.

10. In a drum for a blower for grain separating and cleaning devices, the combination with a series of drums in line and the proper distance apart, each drum having side openings and a rear opening in line, the side walls of each adjoining drum converging together at the rear opening, forming one continuous opening, an adjustable wind-board pivoted to the drums at the edge of the rear openings and having upon its face walls or divisions adapted to fit into each drum, whereby the size of the drum may be regulated.

11. In a blower for grain separating and cleaning devices, a series of drums in line, with spaces between them, each drum having side openings and an opening in front of the mill-sieves, the latter openings being in line, the drums attached together and adapted to be turned upon a common bearing, means upon the outside for turning them, and a wind-board hinged to the drums at the edges of their openings in line, whereby when the drums are turned on their bearings the size of the openings in front of the mill-sieves may be regulated, substantially as described.

12. In a grain separating and cleaning device, the combination with the particular shaking device described and a stationary grain-pan underneath part of the shaking device, and swept by the shaking device, a vibrating grain-pan in front of the stationary grain-pan suspended by springs and by a pivoted lever the arms of the lever passing between antifriction-rollers on the base of the shaking device, whereby the reciprocating motion will be given to the pan as the shaking device is operated, of a cleaning device comprising a box suspended in the frame of the machine by springs, a chaffer within the box receiving the grain from the vibrating pan, the chaffer carried on cranks of a rod passing through the machine and connected to the actuating machinery, and supported in the rear on an arm of a centrally-pivoted bar and connected to the mill-box by a spring, whereby as the chaffer is rotated by the crank-shaft the mill-box will be given a vibrating motion, a series of sieves underneath the chaffer having an alternating reciprocating motion, and a blower comprising a series of sets of fans on a central shaft, each set of fans having a separate drum, the drums having side openings and an opening in front of the sieves in line and converging together, forming a continuous opening in front of the sieves, a wind-board pivoted to the drums and adjusted by turning the drums simultaneously, whereby the direction and volume of wind entering the sieves may be regulated, substantially as described.

13. In a grain-separator, a feed-board with its lower end resting upon the front edge of the concave and adjustable with it, and having a hip in the middle of its lower end and in front of the middle of the cylinder, the hip being integral with the feed-board, the side edges of the feed-board being adapted to engage the curved sides of the frame as the board is adjusted, substantially as and for the purpose set forth.

14. In a cylinder for grain-separating devices, the combination with end pieces and a middle ring, each having notches in their circumference in line, of a plate adapted to fit into the bottom of the notches and extending across the cylinder, connecting the end pieces and middle ring, a bar fitting into and filling up the notches on top of the plate, the bar and plate provided with transverse six-sided slots, in line, the slot being large at its surface and the sides converging together toward the inner end, cylinder-teeth having six sides and sloping toward the top, the base of the tooth having six sides adapted to fit the sloping walls of the slots and be held therein, and small teeth between the cylinder-teeth on the bar, the small teeth being integral with the bar and of the same shape as the cylinder-teeth, substantially as and for the purpose set forth.

15. In a grain-separator, a cylinder-bar adapted to be secured to and form the circumference of the cylinder, the bar having cast within its length one or more rods, and having on their outer surface a series of small teeth or fins, the fins being larger at their base and hexagonal in form, terminating in a point, and hexagonal slots between the fins for receiving the teeth, substantially as specified.

16. In a grain-separator, a cylinder-bar comprising a bar having cast within its length two rods, and having on its surface transverse slots in the bar between the rods, the slots having sloping walls and adapted to receive the six-sided base of the tooth, substantially as described.

17. In a grain-separator, means for adjusting the concave vertically, comprising an adjustable frame upon which the front of the concave rests, a horizontal bar having upon each end a wedge, the wedges of similar size and operated in the same direction under the ends of the frame supporting the concave, a rack on the under side of the horizontal bar engaged by a toothed pinion operated by a crank, whereby as the pinion is turned in one direction the wedged ends of the bar will be forced under the concave-frame, thereby raising it, and when turned in the opposite direction the wedge will be withdrawn, thereby lowering the concave, and means in the rear of the concave for adjusting it comprising a vertical rod passing through the concave with a nut underneath, whereby by turning the nut the rear of the concave may be adjusted, substantially as and for the purpose set forth.

18. In a grain-separator, the combination with the cylinder-shaft carrying a drive-pulley upon one end and a beveled gear and geared pinion upon the other, of a stub-shaft journaled in the frame at the side of and parallel to the cylinder-shaft, and adapted to be moved longitudinally in its boxing, and having a beveled gear adapted to mesh into the beveled gear on the end of the cylinder-shaft, and a pinion adapted to mesh into the pinion on the cylinder-shaft when the stub-shaft is moved as described, and a shaft extending obliquely across the machine and having a double-beveled gear adapted to engage both the cylinder-gear and the stub-shaft gear, substantially as and for the purpose set forth.

19. In a grain-separator, the combination with a shaft extending obliquely across the machine from engagement with the cylinder-shaft to the stacking device, and provided with gearing engaging gearing on shafts operating the working parts of the machine, of means as set forth for moving the shaft longitudinally and throwing it out of gear, thereby stopping the entire working of the machine except the cylinder, substantially as and for the purpose set forth.

20. In a grain-separator, the means described for operating the grain-augers comprising a shaft extending from the auger to the drive-shaft, terminating in a loose collar on the drive-shaft and connecting beveled gear adapted to mesh into beveled gear on the drive-shaft, a pivoted spring-lever engaging the loose collar and adapted to slide it with its shaft on the drive-shaft so as to throw the auger in or out of gear, and a rack for holding the lever when adjusted, substantially as and for the purpose set forth.

21. In a grain-separator, the combination with the drive-shaft, a shaft extending to the grain-auger and having a loose collar on the drive-shaft, and a beveled gear adapted to engage a beveled gear on the drive-shaft, of means for reversing the auger comprising another beveled gear on the drive-shaft adapted to engage the beveled gear of the auger-shaft when moved longitudinally on the drive-shaft, a pivoted lever engaging the loose collar of the auger-shaft on the drive-shaft and adapted to move the collar and shaft on the drive-shaft into engagement with the other beveled gear, and a rack for holding the lever in the position to which it moved, substantially as and for the purpose set forth.

22. In a grain-separator, the combination with the grain-auger and the auger for receiving and discharging the screenings arranged side by side with a wall between the grain-auger in front, the board $L^{18}$ in the cleaning device arranged to discharge the grain into the grain-auger over the other auger, and the bottom of the shaking device arranged to discharge the screenings into the other auger, of the extension base-board $L^{15}$ having transverse serrations sloping rearwardly, whereby grain blown out of the cleaning device may be caught and directed into the machine as described, and the screen $L^{19}$ at the inner end of the extension-board $L^{15}$, and the trap $L^{20}$ just back of the rear auger and in the bottom board, for the purpose of preventing small seeds and broken grain falling upon the extension-board and directed toward the rear auger, passing into the elevator and into the machine the second time.

23. In a grain-separator, the combination with the cylinder-frame, hexagonal-shaped teeth secured in hexagonal-shaped slots in the cylinder-frame, hexagonal fins integral with the cylinder-frame, and between the cylinder-teeth, of a two-part concave, hexagonal teeth secured in hexagonal slots in the concave, hexagonal fins integral with the concave and between the teeth, one part of the concave being mortised, the other provided with tenons fitting the mortises, whereby the parts may be held together and the teeth kept in alinement, and a feed-board having its lower end resting upon the adjustable frame of the concave and having integral with it a hip in front of the middle of the cylinder, whereby the straw will be fed to the sides of the cylinder, substantially as specified.

24. In a grain-separator, the combination with the forward truck and the tongue $A^2$ resting upon and secured to the axle at the middle thereof and having a recess at the top thereof over the axle, the rear end of the recess having a concavity, of the spherical ball $a^2$ secured to the lower end of the depending post $A^{3\prime}$ secured to the frame of the machine, and the depending post, the ball $a^2$ resting in the recess in the tongue and against the concave end of the recess, and the cap $A^3$ having a concavity on the outside thereof, the cap adapted to be placed in the recess in the tongue with the concavity thereof against the spherical ball $a^2$, thereby forming with the tongue a socket for the ball, and the bolt $A^4$ passing through the tongue and the cap $A^3$ and holding the cap in position against the ball, whereby the ball will be held within the recess in the tongue and a bearing formed for it, substantially as and for the purpose set forth.

FRANK EVES.
MYRON EVES.

Witnesses:
JENNIE EVES,
LULU HANNER.